(12) United States Patent
Warrington et al.

(10) Patent No.: US 6,743,453 B2
(45) Date of Patent: Jun. 1, 2004

(54) SYSTEM FOR CONTINUOUSLY PRODUCING GUM WITH IMPROVED TEXTURE AND FLAVOR RELEASE

(75) Inventors: Richard Mark Warrington, Sparta, NJ (US); Bharat Jani, East Brunswick, NJ (US); George Albert Barrera, Caledonia, IL (US); William M. Polak, Morris Plains, NJ (US); Joseph M. Bunkers, Caledonia, IL (US); James Duggan, Machesney Park, IL (US)

(73) Assignee: Cadbury Adams USA LLC, Parsippany, NJ (US)

( * ) Notice: Subject to any disclaimer, the term of this patent is extended or adjusted under 35 U.S.C. 154(b) by 0 days.

(21) Appl. No.: 10/147,539

(22) Filed: May 16, 2002

(65) Prior Publication Data

US 2002/0136796 A1 Sep. 26, 2002

Related U.S. Application Data

(60) Division of application No. 09/586,137, filed on Jun. 2, 2000, now Pat. No. 6,630,182, which is a continuation-in-part of application No. 09/001,158, filed on Dec. 30, 1997, now abandoned.

(51) Int. Cl.[7] .................................................. A23G 3/30
(52) U.S. Cl. ............................ 426/231; 426/5; 426/516
(58) Field of Search ............................... 426/3, 5, 231, 426/516

(56) References Cited

U.S. PATENT DOCUMENTS 4,374,858 A * 2/1983 Glass et al. ..................... 426/5

* cited by examiner

Primary Examiner—George C. Yeung

(57) ABSTRACT

An improved process for continuously producing chewing gum products. A continuous extrusion machine is utilized preferably with a rotating twin-screw mixing mechanism. The timing and location of entry and the apportioned amounts of the flavor and sugar ingredients are adjusted according to preestablished data in order to provide a product with desired flavor and texture profiles. The temperature and pressure of the product are also kept within prespecified ranges.

6 Claims, 10 Drawing Sheets

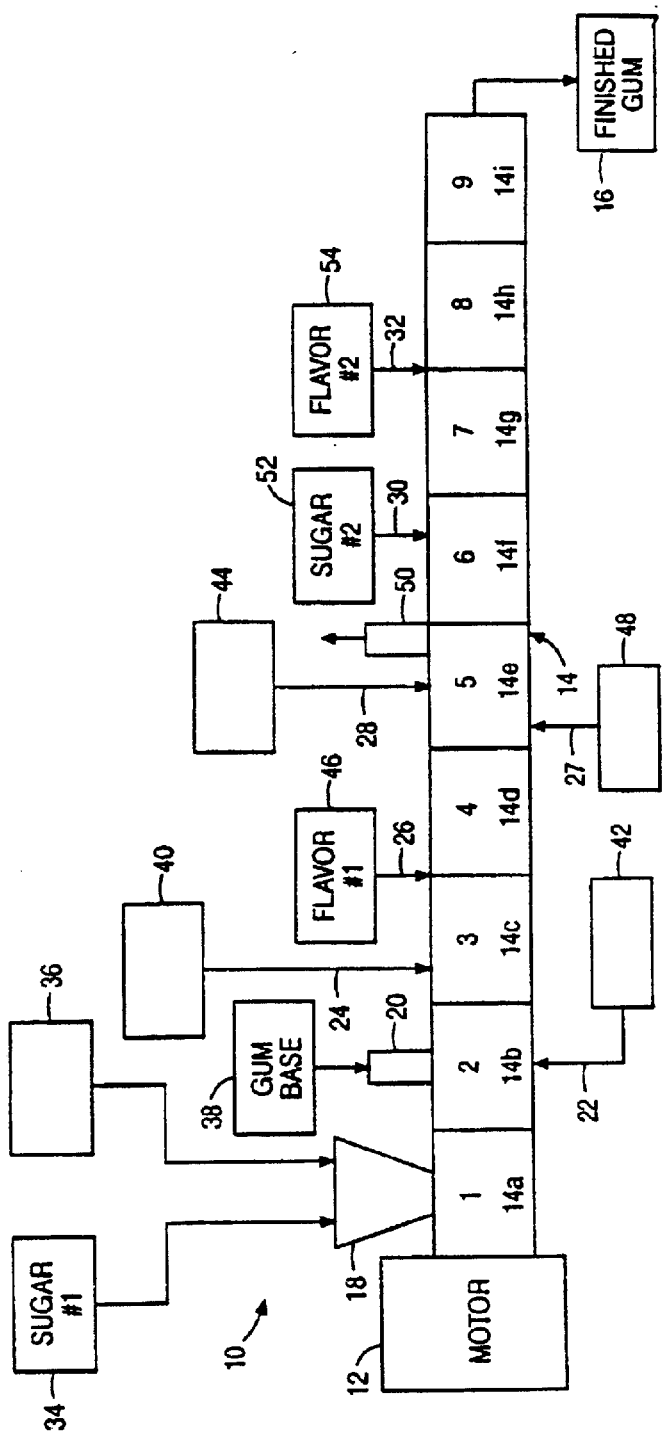

| Sample | RPM | Sugar Split | Flavor Location | Flavor % | Multivariate Distance From Average Control |
|---|---|---|---|---|---|
| 1 | 55 | 80:20 | 4 | 80 | 6.608 |
| 2 | 70 | 80:20 | 4 | 90 | 6.351 |
| 3 | 55 | 100:0 | 4 | 90 | 6.543 |
| 4 | 70 | 100:0 | 4 | 80 | 5.439 |
| 5 | 55 | 80:20 | 7/8 | 90 | 5.808 |
| 6 | 70 | 80:20 | 7/8 | 80 | 10.445 |
| 7 | 55 | 100:0 | 7/8 | 80 | 5.766 |
| 8 | 70 | 100:0 | 7/8 | 90 | 6.117 |
| 9 | 60 | 100:0 | 4 | 85 | 8.251 |
| 10 | 60 | 80:20 | 7/8 | 85 | 9.386 |

|                        | Sample |   |   |   |   |   |   |   |   |    |         |
|------------------------|---|---|---|---|---|---|---|---|---|----|---------|
| Attribute              | 1 | 2 | 3 | 4 | 5 | 6 | 7 | 8 | 9 | 10 | Control |
| Initial                |   |   |   |   |   |   |   |   |   |    |         |
| Hardness               | ⇓ | ⇓ | ⇓ | − | ↓ | ↓ | − | − | − | −  | 60.4    |
| 30 Seconds             |   |   |   |   |   |   |   |   |   |    |         |
| Fruit Flavor           | ↑ | − | ↑ | − | − | − | ⇑ | ⇑ | − | −  | 66.5    |
| Strawberry Jam         | − | − | ↑ | − | − | − | ⇑ | ⇑ | − | −  | 37.4    |
| Sweetness              | ⇑ | − | ⇑ | − | − | − | − | ↑ | ↑ | ↑  | 58.9    |
| Sourness               | − | − | − | − | − | ⇓ | − | − | − | ⇓  | 33.1    |
| 1 Minute               |   |   |   |   |   |   |   |   |   |    |         |
| Fruit Flavor           | − | − | − | − | − | ↓ | − | ↑ | − | −  | 66.1    |
| Strawberry Jam         | − | − | ↑ | − | − | − | ↑ | − | − | −  | 38.6    |
| Sweetness              | − | − | − | − | − | − | − | ↑ | − | −  | 63.4    |
| Sourness               | − | ⇓ | − | − | − | ⇓ | − | − | − | ⇓  | 37.6    |
| Hardness               | − | − | − | ⇑ | ⇓ | − | − | − | − | −  | 50.6    |
| Toughness              | − | − | − | ⇑ | − | ⇓ | − | − | − | −  | 63.3    |
| Graininess             | − | − | − | − | − | − | − | − | − | ↑  | 38.3    |
| Ease Of Bubble Blowing | − | − | − | − | − | ⇓ | − | ↓ | − | −  | 73.2    |
| 2.5 Minutes            |   |   |   |   |   |   |   |   |   |    |         |
| Fruit Flavor           | − | − | − | − | − | ⇓ | − | − | − | −  | 61.6    |
| Strawberry Jam         | − | − | − | − | − | − | − | − | − | −  | 32.1    |
| Sweetness              | − | − | − | − | − | ⇓ | − | − | − | −  | 57.8    |
| Sourness               | − | ↓ | ⇓ | − | − | ⇑ | ⇓ | − | ⇓ | −  | 29.3    |
| Hardness               | − | − | − | − | − | − | − | − | − | −  | 55.0    |
| Toughness              | − | − | − | ↑ | − | ⇓ | − | − | − | −  | 72.6    |
| Graininess             | − | − | − | − | − | − | − | − | − | −  | 27.8    |
| Ease Of Bubble Blowing | − | − | − | − | − | − | − | − | − | −  | 82.6    |

|  | Sample | | | | | | | | | | |
|---|---|---|---|---|---|---|---|---|---|---|---|
| Attribute | 1 | 2 | 3 | 4 | 5 | 6 | 7 | 8 | 9 | 10 | Control |
| 5 Minutes | | | | | | | | | | | |
| Fruit Flavor | — | — | — | — | — | — | — | — | — | — | 48.8 |
| Strawberry Jam | — | — | — | — | — | — | — | — | — | — | 18.1 |
| Sweetness | — | — | ↓ | — | — | — | — | — | — | — | 47.1 |
| Sourness | — | — | — | — | — | — | ⇓ | — | — | — | 17.3 |
| Hardness | — | — | — | — | — | — | ⇓ | — | — | — | 58.2 |
| Toughness | — | — | — | ⇑ | — | — | — | — | — | — | 78.4 |
| Graininess | ⇓ | — | — | ⇓ | — | — | — | — | — | ↓ | 19.2 |
| Ease Of Bubble Blowing | — | — | — | — | — | — | — | — | — | — | 89.6 |
| 7 Minutes | | | | | | | | | | | |
| Fruit Flavor | — | — | — | — | — | — | — | — | — | — | 41.1 |
| Strawberry Jam | — | — | — | — | — | — | — | — | — | — | 13.2 |
| Sweetnes | — | — | — | — | — | — | — | — | — | — | 35.2 |
| Sourness | — | — | — | — | — | ⇓ | — | — | — | ⇓ | 15.1 |
| Hardness | — | — | — | — | ↓ | ⇓ | — | — | — | — | 58.8 |
| Toughness | — | — | ↑ | — | — | — | — | — | — | ↓ | 81.2 |
| Graininess | ⇓ | — | ↓ | — | — | ⇓ | — | ↓ | ⇓ | ⇓ | 15.5 |
| Ease Of Bubble Blowing | — | — | — | — | — | — | — | — | — | — | 91.7 |
| 10 Minutes | | | | | | | | | | | |
| Fruit Flavor | — | — | — | — | — | — | — | — | — | — | 32.5 |
| Strawberry | — | ↓ | — | — | — | — | — | — | — | — | 8.3 |
| Sweetness | — | — | — | — | — | — | — | — | — | — | 22.3 |
| Sourness | — | — | — | — | — | — | — | — | — | — | 9.1 |
| Hardness | — | — | — | — | — | — | — | — | — | — | 58.9 |
| Toughness | — | — | — | ↑ | — | — | — | — | — | — | 83.2 |
| Graininess | ⇓ | — | — | ⇓ | ⇓ | ⇓ | — | — | ⇓ | — | 12.5 |
| Ease Of Bubble Blowing | — | — | — | — | — | — | — | — | — | — | 91.2 |

SYSTEM FOR CONTINUOUSLY PRODUCING GUM WITH IMPROVED TEXTURE AND FLAVOR RELEASE

CROSS-REFERENCE TO RELATED APPLICATIONS

This is a divisional of U.S. patent application Ser. No. 09/586,137 filed on Jun. 2, 2000, now U.S. Pat. No. 6,630,182 which is a continuation-in-part of U.S. application Ser. No. 09/001,158 filed on Dec. 30, 1997 abandoned.

TECHNICAL FIELD

This invention relates to improved processes for continuously producing gums, such as chewing gums and bubble gums, which have improved texture and flavor release.

BACKGROUND OF THE INVENTION

There are several systems known today for is producing gum bases and final gum products, such as chewing gums and bubble gums. The present invention can be used with all types of sugared chewing gums and bubble gums. For ease of reference, all such gums will be referred to herein by the single term "chewing gum". Typically, the chewing gum base is made separately from the final chewing gum product, although there are several systems which are capable of producing a final chewing gum product in one continuous process.

In general, a typical chewing gum composition comprises a water-soluble bulk portion, a water-insoluble chewing gum base portion, water, and soluble flavoring agents. The insoluble gum base generally comprises elastomers, elastomer solvents, fillers, resins, polyvinyl acetate (PVA), fats, plasticizers, waxes, emulsifiers, and other miscellaneous ingredients. The flavoring can be added in various forms, and can either be sugar based for sweetness or acid based for sourness or tartness. The water-soluble portion of the gum composition decimates with a portion of the flavoring agents over a period of time during chewing. The elastomeric gum base portion is retained throughout the time the product is chewed.

Numerous chewing gums and chewing gum bases in the past have been produced using batch methods. Single blade batch mixers are typically used for these processes. The gum base ingredients are added either separately or simultaneously into the batch mixer and the materials are melted and mixed over time. After the gum base is processed, the molten gum base batch is emptied into coated or lined pans, or transferred to other equipment such as holding tanks or filling devices, then extruded or cast into shape, and allowed to cool and solidify, before being ready for use in a chewing gum.

When the final chewing gum products are processed using a batch method, portions of the gum base, together with softeners and bulking agents, are added to the mixer. Later, flavorings such as flavored oils and/or spray-dried flavors (sweeteners or acids) are added while mixing is continued until a homogenous mass is achieved. Systems of this type are shown, for example, in U.S. Pat. Nos. 4,816,265, 5,000,965 and 5,057,328. The chewing gum mass is subsequently cooled and later rolled, scored, and wrapped into the final product.

Continuous extrusion machines have also been used for producing chewing gum bases and the final chewing gum products, or both. The use of continuous extruders to make a final chewing gum product is shown, for example, is U.S. Pat. No. 5,135,762 to Degady et al., U.S. Pat. No. 5,045,325 to Lesko et al., and U.S. Pat. No. 4,555,407 to Kramer et al. Processes known in the art for continuously producing a chewing gum base with the use of a continuous extrusion machine are shown, for example, in U.S. Pat. Nos. 5,419,919 and 5,486,366 both to Song et al.

The chewing gum base and chewing gum product processes disclosed in these patents typically utilize a continuous extrusion machine, such as a twin-screw extruder. These extruders typically have several different feed inlets where the ingredients are added. is The elongated screws inside the barrels of the extruders are equipped with different types of mixing and conveying elements. Continuous extrusion machines that can be used for producing chewing gum bases and final chewing gum products include extruders from Togum, Baker Perkins, Werner & Pfleiderer Corp., Japan Steel Works, Leistriztz, WLS, and Buss Manufacturing Company.

Several efforts have been attempted in the past to extend the flavor of chewing gums over a longer period of time. These efforts include, for example, a controlled release of flavoring, micro-encapsulation of flavoring or other materials, and the like. Such systems are shown, for example, in U.S. Pat. No. 5,057,328 to Cherukuri et al. and U.S. Pat. No. 5,116,627 to Rutherford et al. Other methods involve granulating or agglomerating ingredients into a granular matrix to provide for a more controlled release of ingredients. This is shown, for example, in U.S. Pat. No. 5,124,160 to Zibell et al. Efforts have also been made to change the texture of the final chewing gum product. Certain textures have been found to be preferred by consumers depending on the type and flavor of the gum.

It is a general object of the present invention to provide an improved process for the production of chewing gum products. It is also an object of the present invention to provide an improved process for increasing the length of the flavor profile for the chewing gum product.

It is still another object of the present invention to provide a system for continuously preparing chewing gum products which have a controlled texture profile as well as a controlled flavor profile. It is a further object of the present invention to provide an improved process for continuously producing chewing gum products in which the flavor is released more slowly and evenly than in known chewing gum products.

These and other objects are met by the present invention in which a preferred form of the invention is described hereinafter.

SUMMARY OF THE INVENTION

The present invention provides an improved system for continuously producing a chewing gum product. In particular, the present invention provides an improved process for producing a final chewing gum product which has an improved texture and which can have its flavor profile changed as desired to have an initial "burst" of flavor and/or a slower and longer release of flavor. The final texture of the gum can also be adjusted as desired and also adjusted depending on the particular flavor and flavor profile desired.

In accordance with the present invention, a continuous extrusion processor is used to produce the chewing gum product. Various ingredients are added to the extruder, including a gum base, sugar, softeners, plasticizers, oils and flavoring. The sugar is divided into two portions with one portion being added at the beginning of the extrusion process and the other portion being added as one of the last ingredients. Dividing the sugar into two portions affects the texture of the final chewing gum product and makes it smoother and more chewable. Adding the flavor downstream of the other ingredients creates an initial "burst" of flavor when the gum is chewed. Splitting the flavor and adding a portion of it upstream changes the flavor profile of the gum and creates a slower and more even release of the flavor throughout the chew. Any conventional flavorings can be used with the present invention, including sweet flavorings and sour or tart flavorings.

Dividing the sugar material in the extruder, together with controlling other extrusion parameters, such as the speed of the extruder and the temperatures of the various extrusion barrels, allows control of the flavor and texture profiles and allows production of various types of chewing gum products. The present invention allows a better quality final product to be prepared, as well as a product in which the flavor can be released in different amounts and at different times in the chew.

Tables and charts (data) have been created which provide the requisite amounts of sugar and/or flavoring to use in the added portions in order to produce a chewing gum with a prespecified texture and flavor. The data specifies the appropriate operating conditions and temperatures in the extruder and barrel sections, as well as the timing and amounts of ingredients to be added in order to achieve the desired end result. The precise texture and consistency of the final gum product as desired and specified can be provided on a regular and uniform basis without additional time, expense, or experimentation.

Post-extrusion cooling procedures are also unnecessary with the present invention. The extrusion temperatures needed and utilized with the present invention are sufficiently cooler than known processes which require cooling procedures before the gum method can be rolled and scored.

The gum material can further be provided at lower extrusion pressures than known processes and without an extrusion die at the downstream end. Pressures on the order of one atmosphere can be utilized with the present invention.

These and other features, advantages, and benefits of the present invention will become apparent from a review of the following description, when taken in view of the accompanying drawings and appended claims.

BRIEF DESCRIPTION OF THE DRAWINGS

FIG. 1 is a schematic diagram of a continuous chewing gum system in accordance with the present invention;

FIG. 2 depicts the system of FIG. 1 in which a side feeder is utilized;

FIGS. 4A and 4B are two portions of another table which set forth test data relative to the sample products specified in FIG. 3;

BEST MODES FOR CARRYING OUT THE INVENTION

Figures 3, 16:
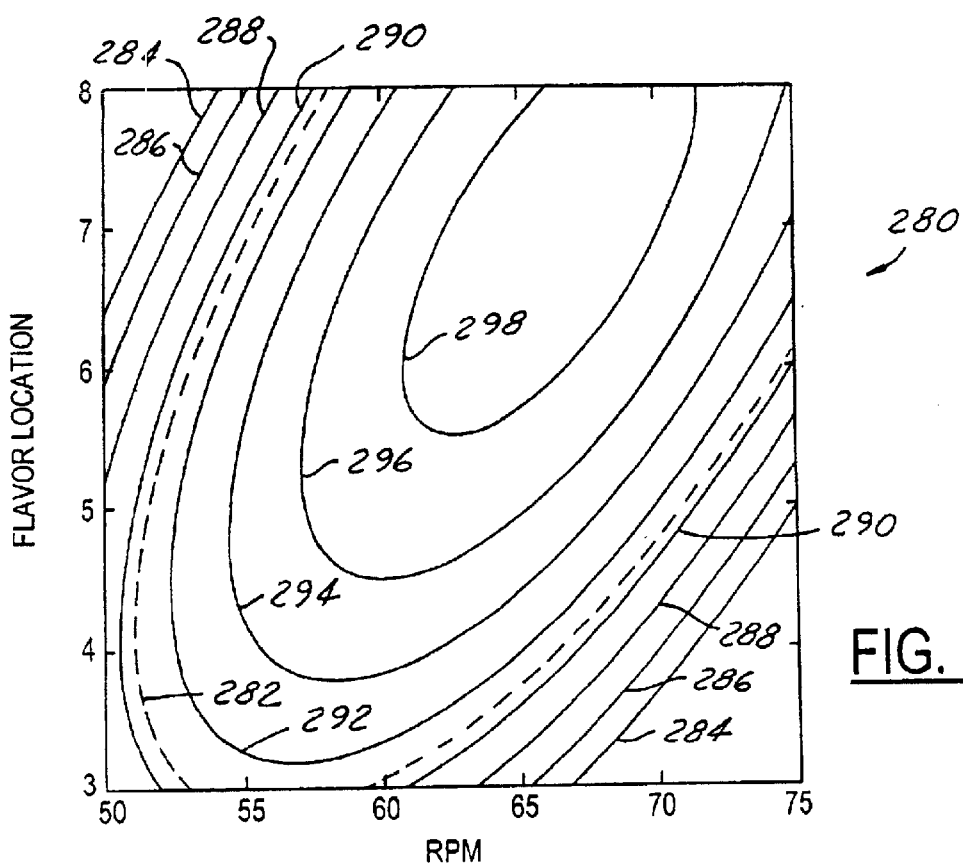
FIG. 3 is a table setting forth data relative to test sample products.
FIGS. 6–16 are graphs which show the relationships of certain factors and their effect on sensory attributes of the chewing gum product.

Referring to FIG. 1, a continuous chewing gum manufacturing process is shown schematically which utilizes an extrusion mixer 10. The extruder 10 can be of any conventional type and has a motor and control mechanism 12 and an elongated barrel member 14. The continuous extruder 10 can be of any conventional type available from many extruder manufacturers known today, such as Japan Steel Works, Leistriztz, Werner & Pfleiderer Corp., Togum, WLS, Baker Perkins, and/or Buss Manufacturing Company. Preferably, however, the continuous extruder 10 is a co-rotating twin screw extruder.

Typically, the continuous extrusion machines use twin-screw mechanisms which are either co-rotational, counter-rotational, intermeshing or tangential. These extruders have one or two elongated screw members in the barrels 14 which intermix and process ingredients and materials for the final gum product 16. The elongated screw members utilize different types of screw elements for processing the materials that are fed into the barrel 14.

The most common types of screw elements include conveying elements, compression elements, reverse conveyance elements, homogenizing elements such as shearing disks and tooth elements, and kneading disks and kneading blocks. These elements, and other elements typically used in extruding machines, especially twin-screw extruders, are well known in the art and are commercially available. The elements are often specifically designed for the particular type of extruder utilized and the particular type of ingredients utilized in the final desired product.

The extruders typically have a number of separate stages along the length of the barrel 14. In the preferred Werner & Pfleiderer embodiment shown in FIG. 1, nine separate barrel sections or members are provided (numbered 1–9). Each of the barrel sections 14a through 14i are separately heated and cooled in order to maintain the material within the barrel at an appropriate processing temperature and consistency.

The extruders typically have several different feed inlets where the ingredients are added. For example, as shown in FIG. 1, the extruder 10 has a first feed inlet 18 as well as other inlets 20, 22, 24, 26, 27, 28, 30 and 32 positioned downstream on the barrel 14. Typically solid ingredients, such as sugar 34 and salvage 36 are introduced into the barrel through the upstream initial inlet port 18. Other ingredients, usually in a liquid condition, are introduced into one or more of the downstream ports. These other ingredients include, for example, gum base 38, softeners or plasticizers, such as corn syrup 40, lecithin 42 and oil 44, flavorings 46, and coloring 48.

The chewing gum ingredients are added to the barrel of the extruder through one or more conventional mechanisms or systems. For example, the sugar 34 and salvage materials 36 can be added by conventional loss-in-weight (LIW) feeders. The LIW feeders meter and regulate the flow of material into the barrel 14. The gum base 38 is typically introduced into the extruder in a molten condition by means of a conventional metering and pumping system. The softeners, plasticizers, oils and coloring are liquid materials and are typically added into the barrel through conventional liquid metering and pumping systems. The flavoring materials or ingredients 46 are typically injected into the barrel 14 by means of a conventional liquid injection system.

The second portion 52 (sugar #2) of the sugar ingredient can also be added to the main extruder 10' by the use of a conventional side feeder apparatus 60, as shown in FIG. 2.

In the barrel 14, the material and ingredients are introduced into the screw cavity in barrel sections or members 14a–14f (Nos. 1–6) where they are mixed together forming a homogeneous mass. The mixed material is then compressed in barrel sections 14g–14i (Nos. 7–9) where the internal cavity is filled and pressure is built up. A vent 50 is typically provided between the mixing and compression sections of the barrel to eliminate undesired build up of gases prior to the mass of material entering the compression portion of the barrel.

In order to introduce certain materials into the extrusion process, it is also possible to use a side feeder (as shown in FIG. 2). The side feeder can be any conventional extrusion apparatus, such as those available from Buss Manufacturing Company, Baker Perkins, and Werner & Pfleiderer Corp. The side feeder has a motor and control mechanism and an elongated barrel. An inlet chute is used to supply materials to the side feeder. The side feeder is connected to the main extruder, preferably, with an adaptor mechanism.

The gum base 32 is typically intermixed with a filler of some type, such as dicalcium phosphate. The dicalcium phosphate acts as a lubricant or dusting agent. Other conventional materials such as talc or atomite could be used for that same purpose.

Once the gum materials are introduced into the extruder 10, they are conveyed by the elongated screws along the length of the barrel 14. The final gum product 16 is extruded from the extruder 10 at the downstream end.

In accordance with the present invention, certain selected ingredients of the chewing gum product are or can be divided into two portions so that they can be added at different stages in the extrusion process in order to secure different profiles of texture and flavoring. In particular, the sugar and flavoring ingredients can be split into two portions in accordance with the present invention.

As shown in FIG. 1, the sugar ingredient is added at two separate locations in the gum producing system. The sugar is divided into two portions (sugar #1-34 and sugar #2-52), each portion having substantially the same size and volume. The first portion or quantity of sugar 34 is added at the upstream or initial end of the extrusion process, preferably at inlet chute 18 in barrel section 14a (No. 1). The second portion or quantity of sugar 52 is added at a position downstream of all of the other ingredients, such as at barrel section 14f (No. 6).

Splitting the sugar material into two portions and adding them at separate locations in the gum extrusion process affects the graininess and texture of the final product. It results in a more uniform and less granular final gum product than if all the sugar is added at one time and in one location. (Adding all of the required sugar at location 14f (No. 6) results in a less uniform and grainier final gum product.) Adding the sugar at two separate locations also allows the sugar to be blended and mixed into the material mass more evenly, which provides a better sweetness profile over time for the final gum product when it is chewed.

Although the preferred process in accordance with the present invention divides the sugar material into two portions having substantially the same weight and amount, it is also possible to divide the sugar into two portions which differ significantly in weight and amount. For example, adding 60–75% of the sugar material at the downstream location (barrel section 14f) and adding the remaining 25–40% of the sugar material at the initial chute (barrel section 14a) is possible, although it may result in a final gum material which is not as soft as that produced by the preferred process.

The flavor ingredient can also be divided and added in two portions and positions in the extrusion process. For example, the flavor can be divided into two portions with the first portion 46 (Flavor #1) being added at port 26 and the second portion 54 (Flavor #2) being added at the intersection port 32 between barrels 14g and 14h. By adding a portion of the flavor at an upstream portion of the extruder, the flavoring is incorporated more evenly and thoroughly into the gum material in the extruder and results in a more even and longer lasting flavor release in the final product. By adding a portion of the flavor at a downstream port, such as at 32 between barrel sections 14g and 14h, an initial "burst" of flavor can be provided in the final gum product 16.

As indicated above, the flavoring which can be used for the gum product can either be a sweet flavoring or a sour or tart flavoring, each of which is conventionally known in the chewing gum field. In this regard, sour or tart flavorings are typically provided by the addition of a citric acid.

Auxiliary systems (not shown) which aid in the addition and injection of the solid or liquid ingredients into the extruder 10 are positioned along the length of the extruder. Such feeding systems which may include pumping and conveying elements, side feeders, gravity feeders and the like, are all conventionally known and do not have to be shown in detail herein.

If an acid material is added to the extruder 10 in order to get a sour finished gum product, then the amount of acid added should be regulated relative to the amount of sugar in order to prevent graininess in the final product. The acid materials are typically added in a granular condition and if more than 2–3 percent of acid materials are added to the composition, then the splitting of the sugar material into two portions is necessary in order to prevent or minimize the graininess of the final finished gum product.

Also, the speed of the extruder can be changed to control the texture and "hardness" of the final finished gum product 16. The faster the extruder speed, the softer the final gum product since the gum base elastomer is broken down more effectively. On the other hand, the slower the speed of the extruder, then the harder the gum as less elastomer is broken down.

It is also possible to add solid salvage into the final finished gum extrusion process by a side feeder (not shown).

Preferably, the temperature and pressure of the extrusion process in the extruder 10 is kept to a minimum. The conveying elements should provide a minimum build-up of temperature in the barrel 14 and provide a low sheer mixing process. For this purpose, each of the barrel sections 14a–14i are separately cooled with a glycol-water mixture and kept at approximately 0EF. A low temperature is important since it eliminates or minimizes the volatilization of the flavoring in the material in the extruder. This is particularly preferable since flavoring ingredients are often the most expensive ingredients in the gum composition. In this regard, it is preferred to run the twin-screw extrusion machine on the order of 50–100 revolutions per minute (RPM) and keep the temperature of the gum material in the range of 110–125° F.

As indicated above, batch-type processes for preparing chewing gum products have been used in the past. In fact, such processes have been used for is decades and have been able to produce excellent and highly commercially successful chewing gum products. These batch-type processes, wherein all the ingredients are put into one large kettle or mixer, have, through trial and error and long periods of use, been able to produce chewing gums of various types, flavors, and textures. Many of these products have become very popular with consumers and have been produced time after time and batch after batch of a consistent and uniform flavor and texture.

More recently, efforts have been made to produce chewing gum bases and final chewing gum products using continuous extrusion processes and systems. The continuous extrusion processes have many advantages over the older batch-type processes. These advantages include the production of chewing gum products in less time and with less cost, the reduction of labor expense, the ability to automate the gum production process, and the ability to produce chewing gum products in a more efficient manner.

One of the difficulties in the past with batch-type processes has been the ability to change the flavor profile of a product in a consistent manner batch after batch, as well as to change the texture of the final product in a consistent manner. It also has been difficult with batch-type processes and systems to easily and efficiently create new products for testing and market research in a cost efficient and effective manner.

Continuous extrusion processes often have similar difficulties in creating new products, producing products precisely the same as those produced in the older batch-type processes, and in controlling the flavor profile and texture profile in a consistent and expected manner.

The present invention provides a unique process and system for producing chewing gum products in a continuous extrusion process which not only achieves the normal advantages of continuous extrusion processes over batch-type process but, in addition, is able to produce consistent and expected products and results in a known and consistent manner, and is able to change flavor profiles and gum textures as desired and repeatedly, time after time. Also, the present invention can eliminate or minimize post-extrusion cooling procedures and produce the chewing gum products at lower extrusion pressures than known processes.

With the present invention, charts and tables produced from measured data allow the continuous extrusion production of the same chewing gum products at different speeds, flavor introduction locations, and the like. Also with the present invention, the texture and flavor profiles can be adjusted or changed as desired in order to meet and achieve desired results.

In utilizing continuous extrusion processes and producing chewing gum products, there are several features and factors which can be taken into account. For example, the slower the speed of the screw rotation in the extruder, the less the effects of shear on the material and thus the less of adverse effects on the taste and flavor of the resultant product. The slower the extrusion speed also results in less vaporization and loss of flavor. Thus, smaller amounts of certain ingredients can be utilized. For an initial burst of flavor in the chewing gum product, a portion of the flavor can be added close to the downstream end of the extruder. For a more even and slower release of flavor, more of the flavor can be added near the upstream end of the extruder. A decision on whether to split the flavor and how much to add at various portions of the extruder machine depends on a number of factors, and can be dependent upon the preferences of the customers. The hardness of the final gum product can also be affected by the speed of the extrusion process. The faster the extrusion process, the softer the gum will be since more of the elastomer will be broken down.

In accordance with the present invention, tests were carried out in order to determine the effect of various extrusion parameters, such as speed of screw, rotation, ingredient, insertion location, and division of ingredients into separate portions, in order to achieve desired properties. For this purpose, control samples of various gum products were prepared using the older batch-type processes and used as control products. Various samples were then prepared using a continuous extrusion process in which various features and factors were adjusted. The resulting chewing gum products were subsequently tested and evaluated by a group of expert testers.

For example, in one test of a bubble gum product, a regular-sized control batch of the commercial product was made utilizing a conventional batch-type process. Ten samples were then made using a continuous extrusion system of the type shown in FIGS. 1 and 2 and described above. The resulting extruded products were chewed and evaluated by a group of 15–20 people and compared with the control sample from the batch-type process. The ten samples tested are listed in the table 80 shown in FIG. 3. The samples are numbered 1 through 10. In Sample Number 1, the screw of the extrusion machine was set to rotate at 55 revolutions per minute (RPM), and the sugar portion or ingredient of the bubble gum product was split into two portions: 80% of the sugar was inserted in barrel section 14A (see FIG. 1) and the remaining 20% was added in barrel 14F. The flavor ingredient was added in barrel section 4 and only 80% of the normal amount of flavor was used in the extrusion process. According to the sample testers, the multi-variant distance of Sample Number 1 from the control sample was 6.608.

The remaining Sample Numbers 2–10 were prepared in a similar manner, with various speeds, sugar divisions, locations of flavor addition, and flavor percentages. The multi-variant distance from the control samples from the converted batch-type process ranged from 5.439 to 10.445.

In the test illustrated in FIG. 3, the lowest multi-variant distances from the control were determined to be the best since they were the closest to the control sample, which was the commercial product. In this regard, Samples Numbers 4, 5, and 7 were the closest.

The same ten samples were again evaluated by the same 15–20 testers. In this evaluation, the testers evaluated various attributes of the samples, such as flavor, sweetness, sourness, toughness, graininess, and the like, as well as ease of bubble blowing, at various times. The evaluations were made on a scale of 1–10, and each of the samples was evaluated by the testers at prespecified time periods. The evaluations were made initially, i.e., when the testers first started chewing the gum and then at periods of one minute, two and one-half minutes, five minutes, seven minutes, and ten minutes. The results of the evaluations are set forth in the table in FIGS. 4A and 4B. (Due to the size of the table, it is split in the drawings into two parts).

In the FIGS. 4A–4B table, small arrows in the boxes which are pointed vertically upwardly indicate the attribute intensity being evaluated was higher than that same attribute in the control sample. Similarly, arrows pointing in a downward vertical direction indicate that the attribute intensity of the sample was lower than the control sample. Horizontal dashes indicate that no significant difference between the tested sample and the control sample was determined. Also, double arrows in the table indicate an increased level of intensity, approximately twice as much as a single arrow. As an example, in Samples Numbers 1 and 3, the fruit flavor was determined to be higher than the fruit flavor of the control sample at 30 seconds, and in Samples Numbers 7 and 8, the fruit flavor was determined to be substantially higher.

Figure 5:
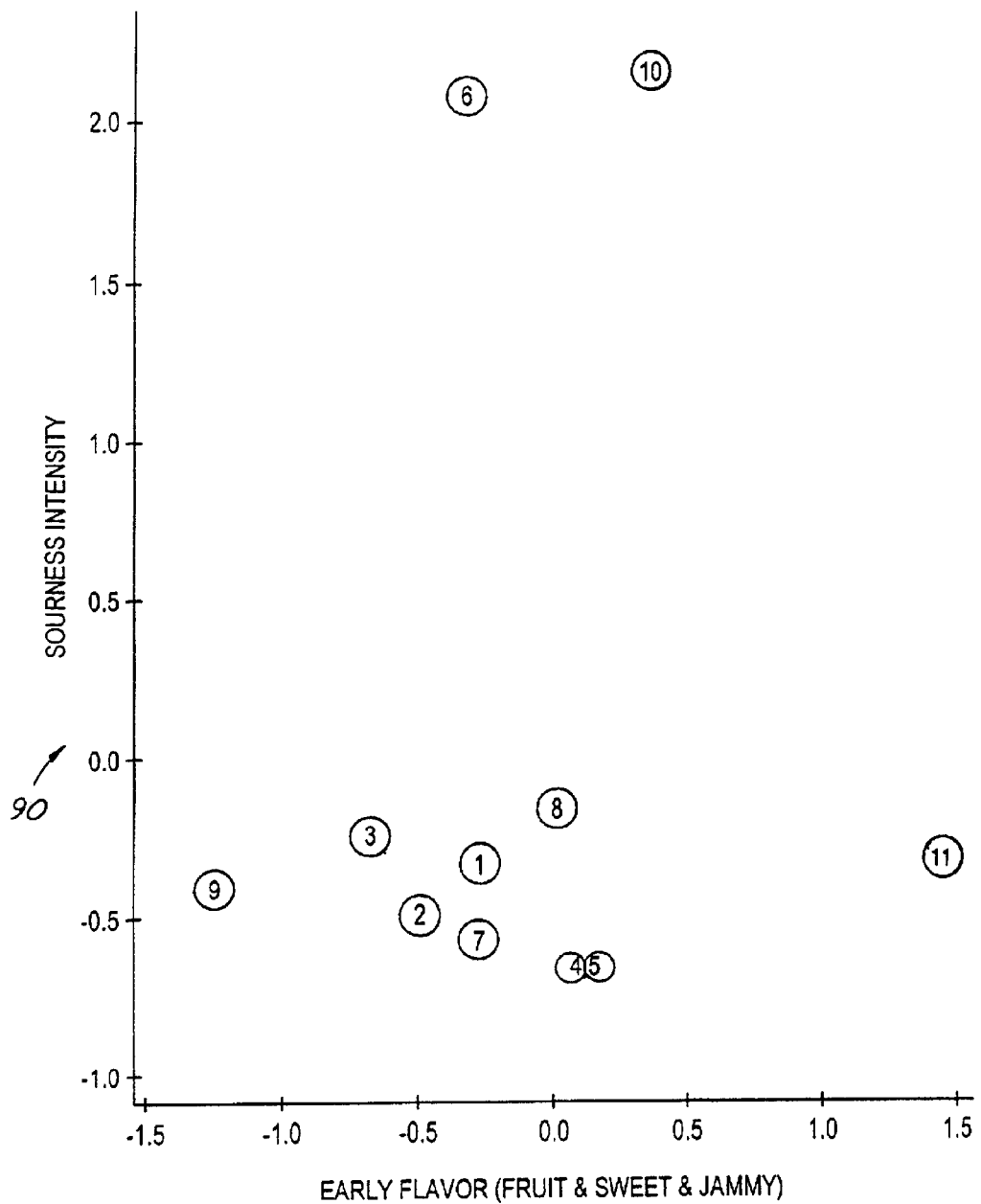
FIG. 5 is a multi-dimensional sketch which plots the results of tests on sample products versus control products.

The data from all of the sensory attributes in the tables 85A and 85B set forth in FIGS. 4A and 4B were then fed into a computer program which produced a number of graphs and curves. An overall multidimensional plot of the ten samples relative to the control is shown in FIG. 5. In this graph, the sensory characteristics of the bubble gum product most affected by the continuous extrusion process, such as sourness intensity and early flavor release, can be determined. The circled numbers 1–10 on the graph shown in FIG. 5 indicate the relative locations for each of the ten samples. The control product is indicated by the circled number 11. The graph indicates the relative distances that the various samples are from the control sample relative to sourness and early flavor release. As shown in FIG. 5, Sample Numbers 4, 5, and 8 are the closest to the control product.

Figure 6:
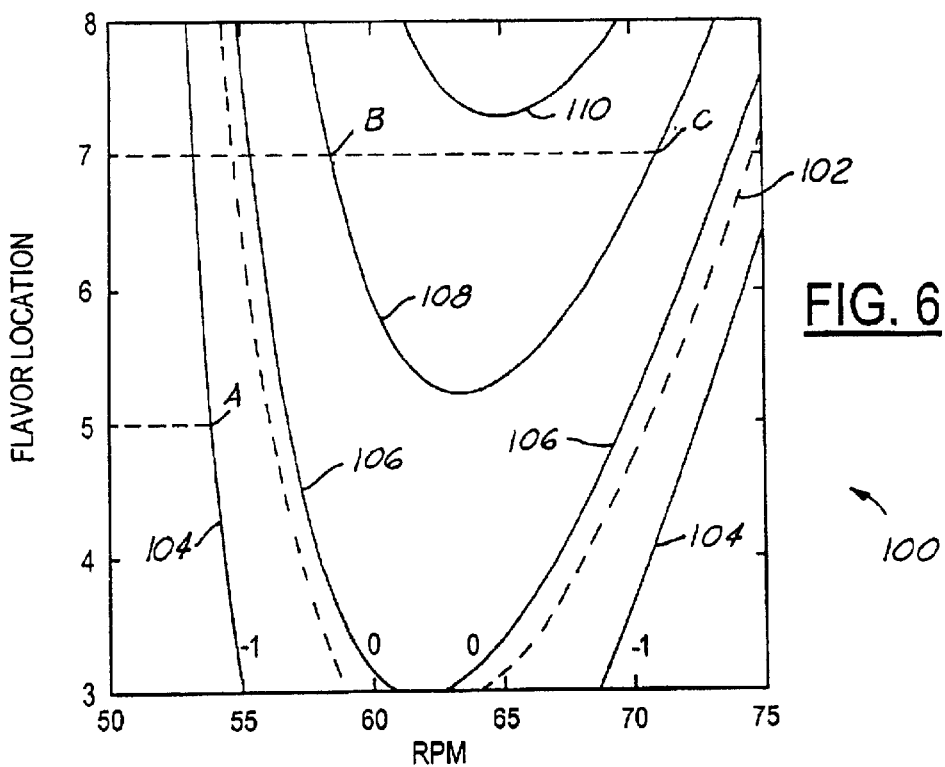

FIG. 6 is a graph 100 illustrating the relationship between the point of location of the addition of the flavor ingredient in the continuous extruder relative to the speed (RPM) of the extruder. It shows the effect of the flavor addition location and the screw rotational speed on the sourness of the bubble gum product. In the graph 100, the dashed curveline 102 represents the control product. On the vertical Y-axis, the numbers 3–8 indicate the barrel in the extrusion machine at which the flavor can be added. The curves 104, 106, 108, and 110 are curves along which each point will give the same property in the resultant chewing gum product. For example, at a speed of slightly less than 55 RPM and with the flavor being added at location or barrel number 5 (14E) in the extrusion machine (point A on curve 104), the same resultant product relative to flavor profile and characteristics can be secured if the flavor is added in barrel number 7 (14G) at either about 59 RPM or 70 RPM (points B and C on curve 108).

Figure 7:
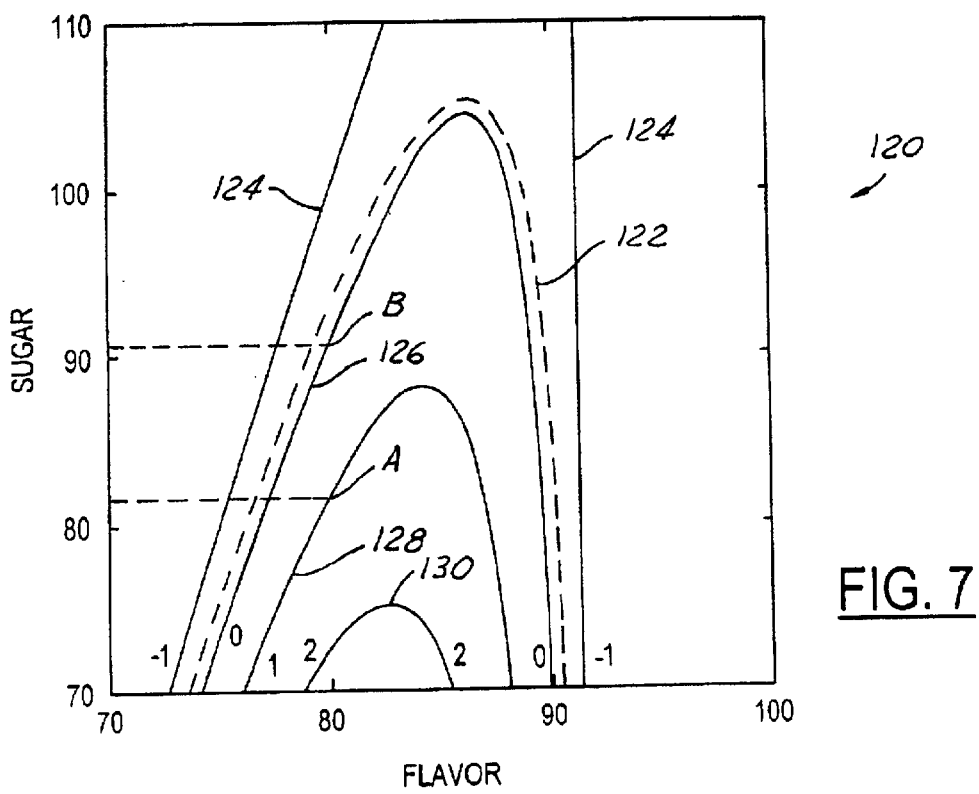

In FIG. 7 graph 120 depicts the effect of the flavor level and the sugar split on the sourness of that same bubble gum product. For example, on the Y-axis, the split of the sugar is indicated: the numeral "80" indicates that 80% of the sugar was added at an upstream portion of the barrel, such as barrel 14A (FIG. 1), with the remaining 20% being added at a downstream portion of the extrusion process, such as barrel 14F. The amount of flavor is indicated along the X-axis of the graph. The percentage of flavor is based on the amount of flavor that is used in the continuous extrusion process versus the amount that was utilized in the batch process for producing the control product. Again, graph 120 in FIG. 7 has a plurality of curves which indicate the control sample or product 122 and for other curves 124, 126, 128, and 130. Similar to the graphs and curves discussed above, all of the points along each of the curves shown in graph 120 produce the same resultant bubble gum product. For example, with flavor at 80%, the sugar can be split 82/18%. This is point A on curve 128. Also, with flavor at 80 percent, the sugar can be split approximately 92% to 8%. This is point B on curve 126.

Figure 8:
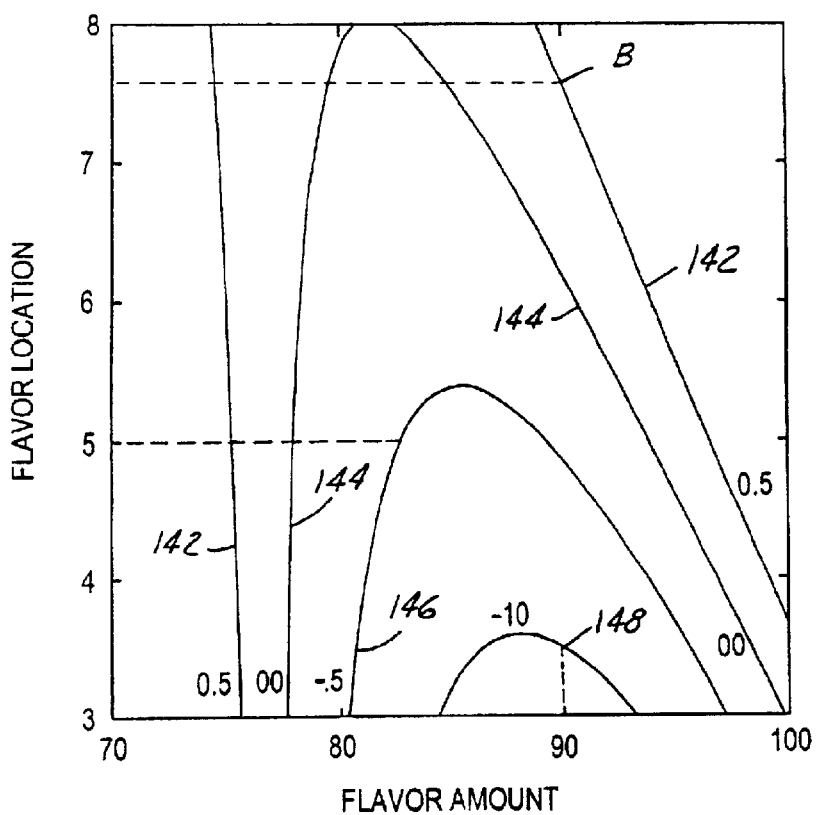

The effect of the flavor addition location and the flavor level or amount on early flavor release is shown in graph 140 in FIG. 8. Again, the amount of flavor along the X-axis is the percentage of the amount of flavor that is used in the continuous extrusion process relative to the amount utilized in the batch-type process to produce the control sample. Also, the flavor location along the Y-axis indicates the barrel portion of the extruder where the flavor is added. Curves 142, 144, 146, and 148 are curves generated from testes and evaluations of the sample products which give the same property at all points along them. For example, at point A, the amount of flavor is approximately 82% and is added in barrel number 5 (14E). At point B, the flavor amount is 90% and is added between barrel numbers 7 and 8 (14A and 14H) in the continuous extruder. The control is not shown in FIG. 8 since it is off the particular portion of the graph shown.

Figure 9:
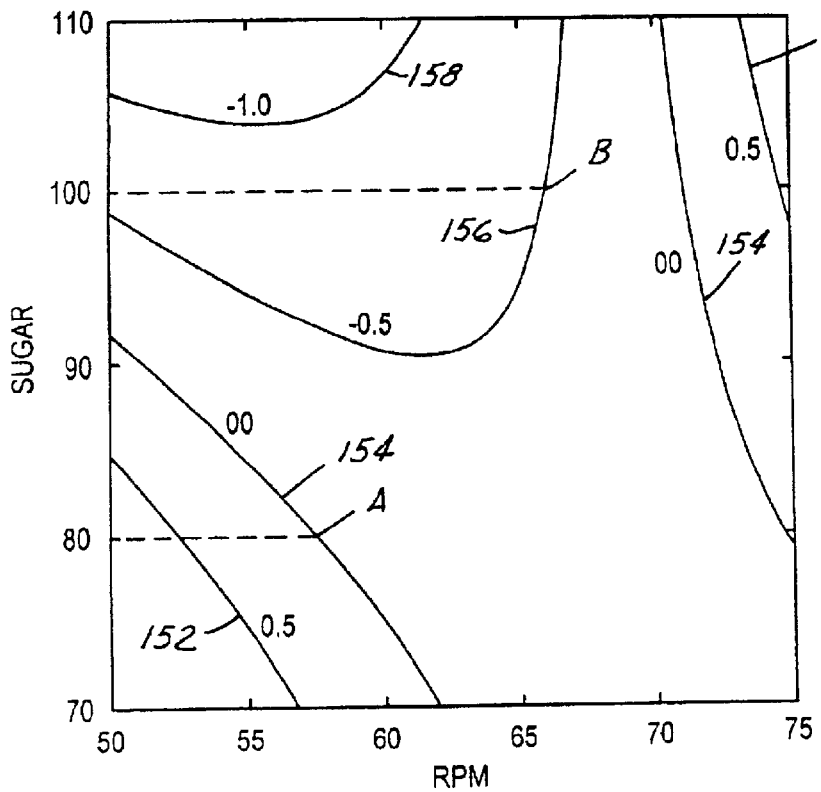

The effect of the sugar split and RPM on the early flavor release of the bubble gum product is shown by graph 150 in FIG. 9. The control is not shown in the portion of the graph 150 illustrated in FIG. 9, since it is off the portion shown. All of the points along curves 152, 154, 156, and 158 provide the same properties for the final chewing gum product. For example, point A on curve 154 designates a point at which 80% of the sugar is added in the upstream end of the barrel (with 20% being added at a downstream location) and the extruder is rotated at a speed of approximately 57–58 RPM. Similarly, at point B on curve 156, when all (100%) of the sugar is added at the upstream barrel portion, the RPM of the extrusion machine is about 66 RPM.

Figure 10:
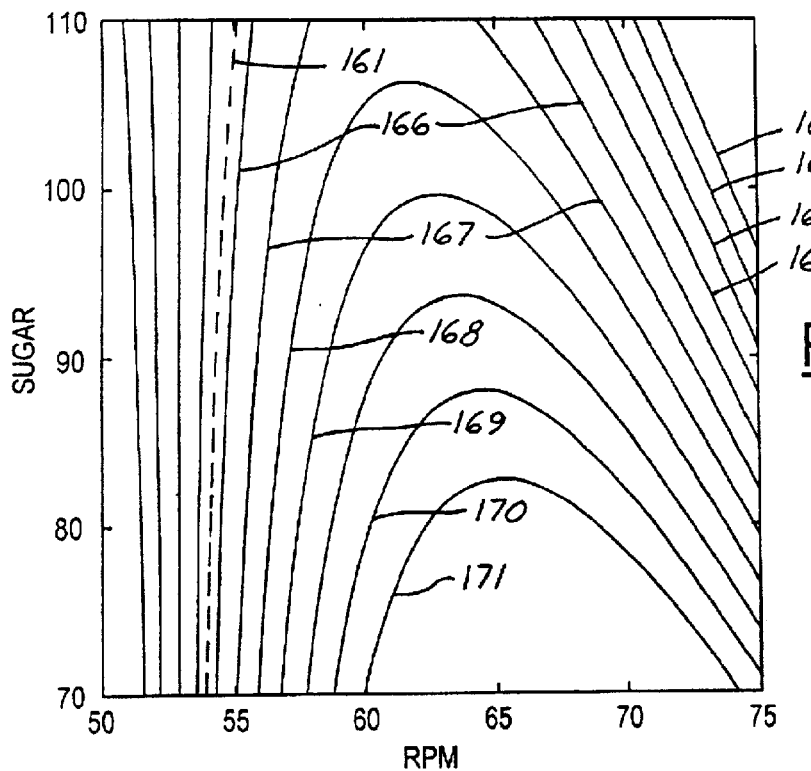

Graph 160 in FIG. 10 illustrates the effect of the split of the sugar ingredient relative to the speed of the extruder machine (RPM) on the early sourness release of the bubble gum product. The control sample is illustrated by dashed curve 161. The other curves 162–171 represent curves on which all points have the same property of the final bubble gum product.

Figure 11:
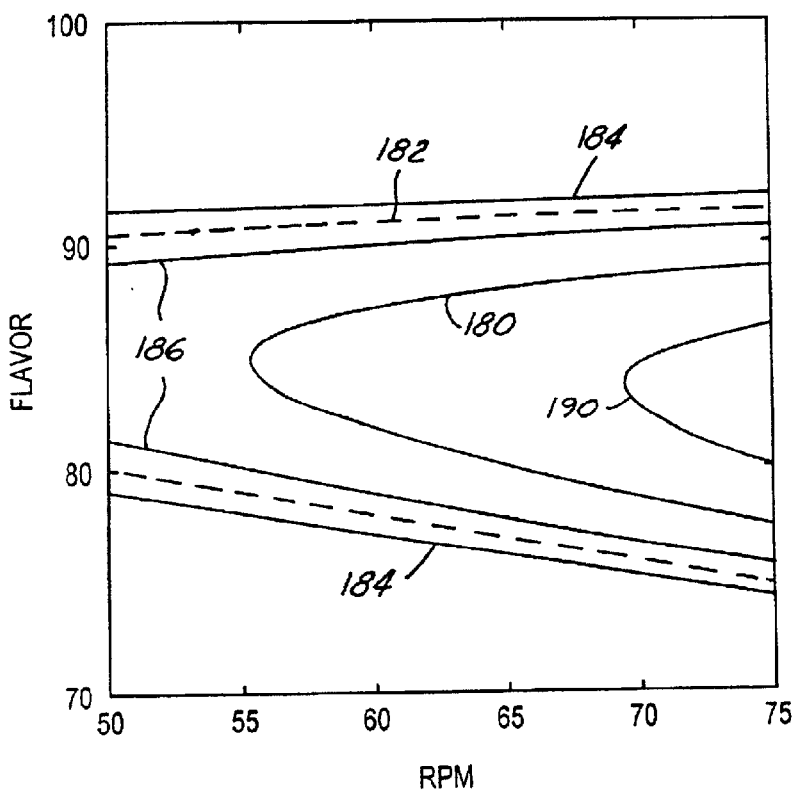

The effect of the flavor level and the speed of the extrusion machine on early sourness release is shown in curve 180 in FIG. 11. The control product is represented by the dashed curve 182. All the points along curves 184, 186, 188, and 190 have the same properties.

Figure 12:
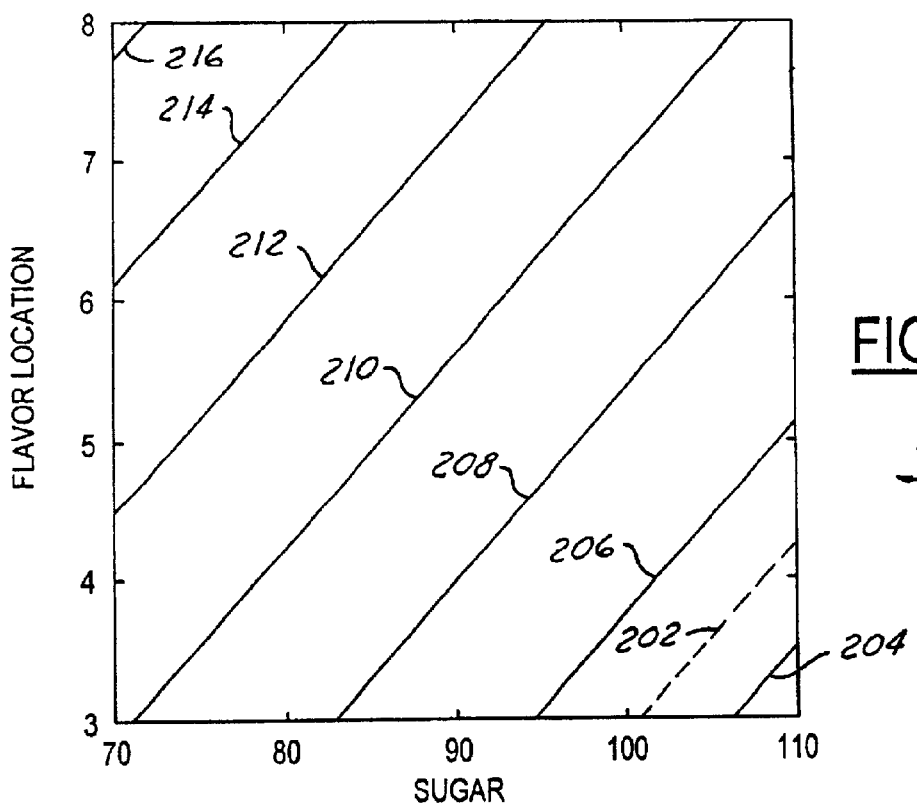

In FIG. 12, the graph 200 illustrates the effect of the flavor addition location and sugar split on the early sourness of the bubble gum product. The control product is represented by the dashed curve 202. Curves 204, 206, 208, 210, 212, 214, and 216 illustrate curves in which all points have the same properties.

Figure 13:
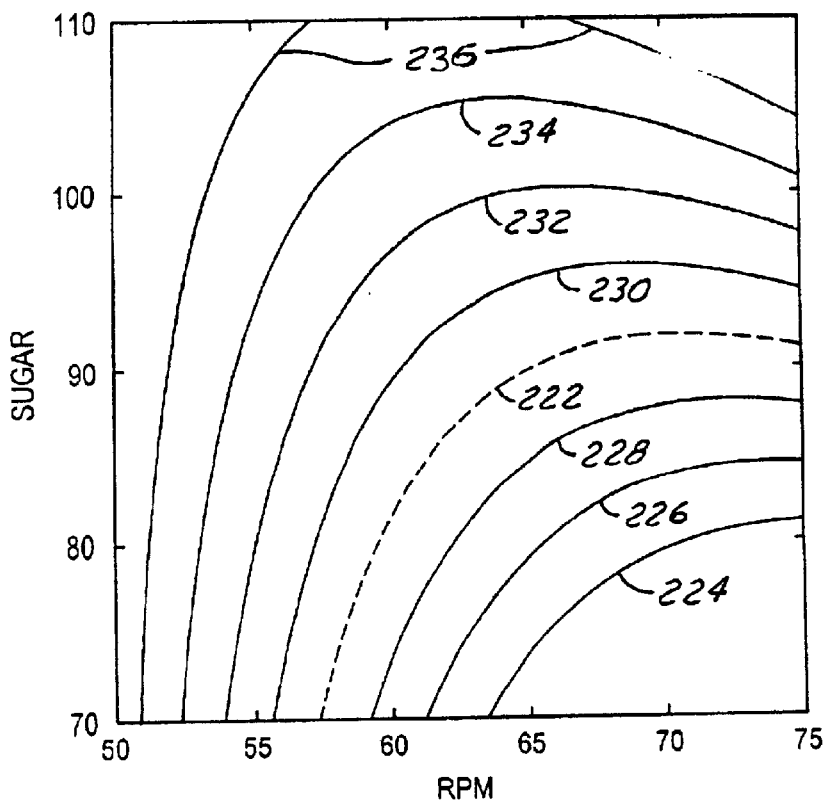

The effect of the sugar split and the speed of the extrusion machine (RPM) on the early fruit flavor of the bubble gum product is shown in graph 220 in FIG. 13. The control product is shown by the dashed curve 222. The remaining curves 224, 226, 228, 230, 232, 234, and 236 all represent other curves in which all points have the same properties relative to the effect of the sugar split and the RPM on the early release of fruit flavor.

Figure 14:
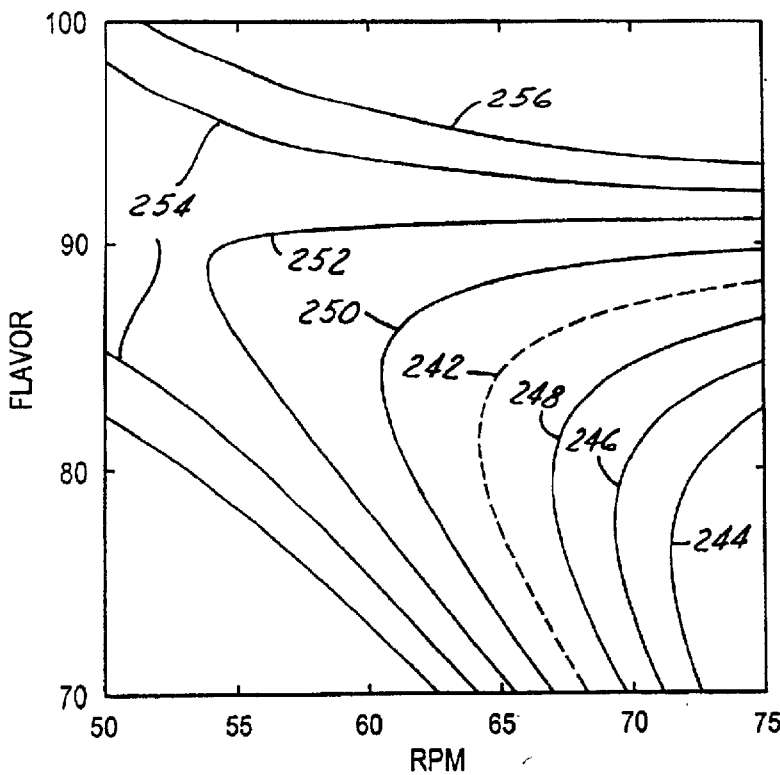

The effect of the flavor level and RPM on the early fruit flavor of the bubble gum product is shown in graph 240 in FIG. 14. The control product is shown by the dashed curve 242. All points along curves 244, 246, 248, 250, 252, 254, and 256 have the same properties in the final product.

Figure 15:
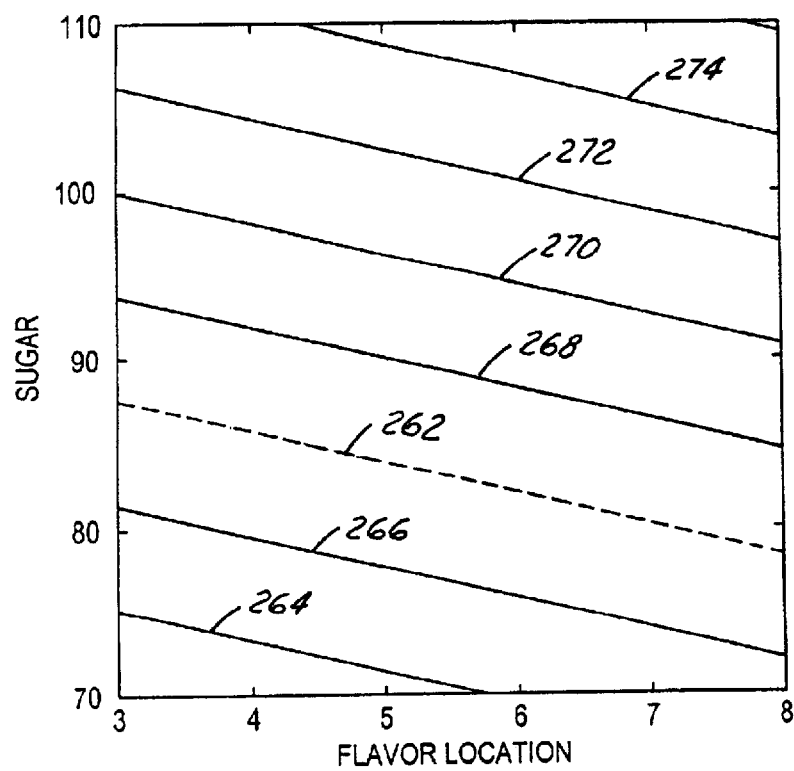

In FIG. 15, graph 260 depicts the effect of the location of the flavor addition on the sugar split relative to the early fruit flavor release of the bubble gum product. The control product is shown by the dashed curve 262. The remaining curves 264, 266, 268, 270, 272, and 274 depict lines of points at which the properties of the final product are the same.

The effect of the flavor addition location and speed of the extruder machine (RPM) on the early sweetness of the bubble gum product is shown in graph 280 in FIG. 16. The control product is shown by dashed curve 282 and the remaining curves 284, 286, 288, 290, 292, 294, 296, and 298 are curves at which points therealong have the same properties in the final product.

With the present invention, it is possible to meet the properties of the control product made by a batch-type process. In this regard, it is possible to control the various parameters and variables of the continuous extrusion machine and process in order to duplicate the control product.

In batch-type processing, more flavor is utilized because the flavor ingredient is typically volatile and a portion escapes during the longer life of the mixing process.

In the examples described above, four variables were taken into account, namely the rotational speed of the extrusion screw (RPM), the amount of sugar added into the extrusion machine at two separate locations, the position of the insertion of the flavor ingredient, and the percentage of the flavor that is added relative to the amount of flavor used in the batch-type process. Preferably, using four variables approximately ten experts are utilized in the evaluation group in order to evaluate the samples and provide a reliable evaluation and data. If three variables are used, typically only eight people or experts are needed. If five variables are evaluated, then a greater number of experts and a greater number of samples should be utilized.

There are also other variables used in the batch-type and extrusion process which can be used in tests and evaluations in order to determine consistency and control, as well as comparisons with batch-type processes. In this regard, other variables which could be used are the split of the flavor ingredient and its addition at different portions along the length of the extruder machine, the temperatures of the various barrel portions in the extruder machine, and the introduction of certain ingredients along the length of the barrel.

Not only can the present invention be used to extrude gum products to match those made by batch-type processes, but the present invention can be used to modify the extrusion processes later based on consumer research or other factors to achieve modified or improved products. In this regard, the temperature profile and the flavor profile can both be controlled. In addition, a prespecified texture could be provided for certain flavors that are preferred by consumers. The speed of the extruder could further be controlled in order to control the hardness of the final gum s product. In this regard, the faster the speed of rotation of the extrusion screw, the softer the resulting gum product will be since the elastomer will be broken down to a further extent.

The modifications of the final gum product that can be made in accordance with the present invention include the texture, the flavor, the acid, the sweetness, the sourness, and the hardness. In this regard, precisely the same formulation of ingredients could be used for each of the gum products and yet the attributes such as texture, flavor, etc. could be modified in accordance with the present invention in order to meet certain requirements or consumer preferences. The mapping curves as shown in FIGS. 6–16 can be used to set the required speed of the extruder, the percent of flavor relative to the batch-type control process, the amount that the sugar ingredient is split, the location of the addition of the flavor in the extruder and the like.

The present invention also eliminates post-extrusion cooling steps which typically are needed with both batch-type processes and other continuous extrusion processes for producing chewing gum products. In this regard, as pointed out above, the temperature of the gum material in the extrusion process is kept within a range of 110–125° F. The barrel portions are cooled with conventional cooling solutions or processes in order to keep the temperatures as low as possible throughout the length of the extrusion machine. In addition, the extrusion process is carried out at a slower speed, on the order of 50–100 revolutions per minute, which also helps maintain the temperature of the ingredients at a lower temperature. Moreover, by s selectively feeding the ingredients, and feeding them gradually in the slow mixing process, the barrel is not full or packed for a significant extent along its length which also assists in maintaining a lower temperature of the process.

Without a post-extrusion cooling process, the present invention provides a process which creates a final gum product faster and with less labor time and expense.

Due to the speed and temperature at which the present inventive continuous extrusion process is carried out, it is possible to maintain the pressure in the extrusion machine at approximately one atmosphere. This eliminates the need to position an extrusion die at the downstream end of the extrusion machine. It also minimizes the possible adverse effects of pressure and temperature on the flavor and taste of the final chewing gum product.

Similar look-up tables and charts could be prepared for any chewing gum product. A control product could be produced using a batch-type process and a number of test samples could be prepared and evaluated by a group of expert testers. From the tests, the variables and factors needed to duplicate the batch-type product using a continuous extrusion process could be established. Also, graphics could be developed which would allow modifying and adjusting the texture and flavor profiles as desired in the future (e.g. to meet consumer preferences or desired final gum properties).

While the best modes for carrying out the invention have been described in detail, those familiar with the art to which this invention relates will recognize various alternative designs and embodiments for practicing the invention within the scope of the appended claims.

What is claimed is:

1. A method of continuously producing a chewing gum material by a continuous extrusion process which has substantially the same properties as the same chewing gum material produced by a batch process, said properties including one or more of the group comprising texture, flavor, flavor profile, sweetness, sourness, toughness, graininess, and bubble blowing, said method comprising the steps of:

producing a control sample of the chewing gum material by a batch process, said material comprising pre-specified ingredients;

producing a plurality of test samples of said chewing gum material by a continuous extrusion process, said material comprising said pre-specified ingredients, said test samples differing from one another based on a variable utilized in said continuous extrusion process, said variables including at least one of the group comprising the relative amount of the sugar ingredient, the timing of the addition of sugar, the location of the addition of sugar, the amount of the flavor ingredient, the timing of the addition of the flavor ingredient, the location of the addition of the flavor ingredient, and the speed of the continuous extrusion process;

evaluating said plurality of test samples;

comparing said evaluations of said plurality of test sample with the properties of said control samples; and selecting one or more of the test samples.

2. The method as set forth in claim 1 wherein at least three of said variables are utilized in the plurality of test samples and wherein said evaluating is carried out by human testers.

3. The method as set forth in claim 1 further comprising the step of modifying at least one of said variables in order to modify at least one of the properties of said chewing gum material made by said continuous extrusion process.

4. A method of continuously producing a chewing gum material by a continuous extrusion mixing process which has at least one of the same properties of texture, flavor or flavor profile as the same chewing gum material produced by a batch mixing process, said method comprising the steps of:

producing a control sample of the chewing gum material by a batch mixing process, said material comprising pre-specified ingredients;

producing a plurality of test samples of said chewing gum material by a continuous extrusion mixing process, said material comprising said pre-specified ingredients, said test samples differing from one another based on at least one variable utilized in said continuous extrusion process, said variable being selected from the group comprising the amounts of one of said pre-specified ingredients being added, the location of the addition of one or more of said pre-specified ingredients, the timing of the addition of one or more of said pre-selected ingredients, the relative amounts of the division of one of said pre-selected ingredients, and the speed of the continuous extrusion mixing process;

evaluating said plurality of test samples;

comparing said evaluations of said plurality of test samples with the properties of said control sample; and selecting one or more of the test samples.

5. The method as set forth in claim 1 wherein at least two of said variables are utilized in the plurality of test samples and wherein said evaluating is carried out by at least one human tester.

6. The method as set forth in claim 1 further comprising the step of modifying at least one of said variables in order to modify at least one of the properties of said chewing gum material made by said continuous extrusion mixing process.

* * * * *